(No Model.)
S. A. SMITH.
WHEEL TIRE.
No. 539,652. Patented May 21, 1895.
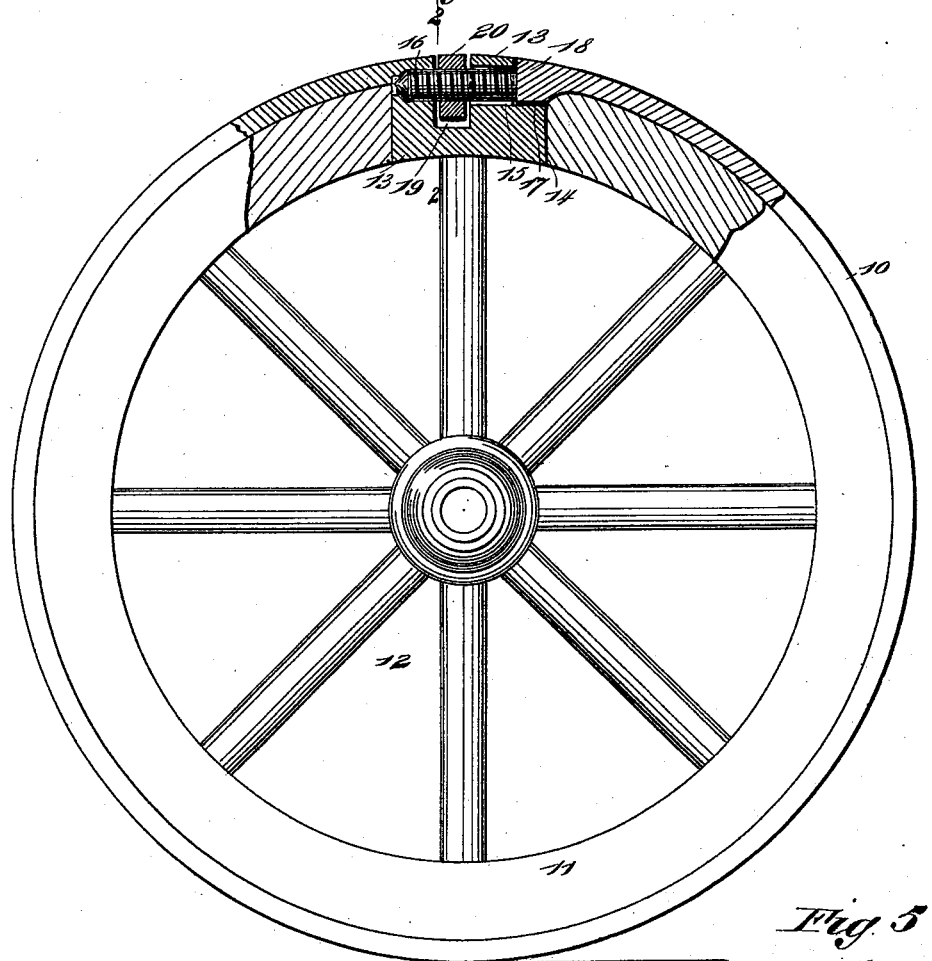
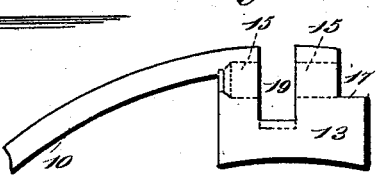
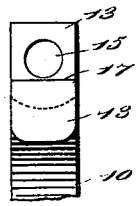
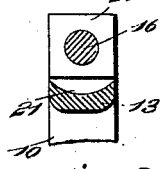
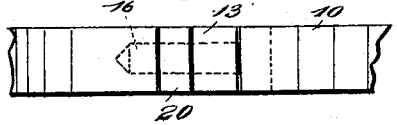
WITNESSES:
INVENTOR
S. A. Smith
BY Munn & Co
ATTORNEYS.

UNITED STATES PATENT OFFICE.

SAMUEL A. SMITH, OF McKINNEY, TEXAS.

WHEEL-TIRE.

SPECIFICATION forming part of Letters Patent No. 539,652, dated May 21, 1895.

Application filed October 15, 1894. Serial No. 525,908. (No model.)

*To all whom it may concern:*

Be it known that I, SAMUEL A. SMITH, of McKinney, in the county of Collin and State of Texas, have invented a new and Improved Wheel-Tire, of which the following is a full, clear, and exact description.

My invention relates to improvements in wheel tires; and the object of my invention is to produce a very cheap and simple tire which may be conveniently applied to any ordinary wheel, but which is especially applicable to wagon wheels, which when applied to the wheel has a perfectly smooth surface, and which has mechanism operated by the simple turning of a nut and adapted to tighten the tire to any desired extent.

To these ends my invention consists of a wheel tire, the construction of which will be hereinafter described and claimed.

Reference is to be had to the accompanying drawings, forming a part of this specification, in which similar figures of reference indicate corresponding parts in all the views.

Figure 1 is a side elevation, partly in section, of my improved tire as applied to a wheel. Fig. 2 is a detail cross-section of the tire on the line 2 2 of Fig. 1. Fig. 3 is a broken plan view showing the meeting ends of the tire and the device for fastening them. Fig. 4 is an end view of the lug at one end of the tire, and Fig. 5 is a broken side elevation showing one end portion of the tire.

The tire 10 is, with the exception of its end portions, like any ordinary tire and it may be made of any necessary shape and size. I have shown it applied to the felly 11 of a wheel 12 and the tire has one end formed into a lug 13 which is adapted to fit a recess 14 in the felly, and thus form practically a part of the felly, as best shown in Fig. 1. This lug has a longitudinal bore 15 to receive the screw 16 which is formed on the opposite end portion of the tire, and the lug has also an end shoulder 17 on which the opposite thickened end 18 of the tire 10 may rest, and the screw above mentioned projects from the said thickened portion 18. The lug 13 is also provided with a transverse recess 19 to receive a tightening nut 20, and the bottom wall of the recess is concaved, as shown at 21 in Fig. 2, to enable the nut to be turned. When the end 18 of the tire is in position on the shoulder 17, with the screw 16 entering the bore 15 of the lug and with the nut 20 on the screw, the outer face of the lug and nut will be just flush with the tire face so that a perfectly smooth joint is made. When the tire is first applied to the wheel the thickened end 18 is not drawn very close to the middle portion of the lug 13, but as the tire loosens, the nut 20 is turned so as to draw the meeting ends of the tire more snugly together, and thus, by adjusting the nut, the tire may always be kept tight.

I am aware that it is not broadly new to connect the two ends of a tire by a screw, but the particular arrangement of the lug and screw, which I have illustrated and described, makes a very firm connection between the tire ends, as the lug forms practically a part of the felly, and the construction is very simple and cheap.

As the lug 13 engages both ends walls of the recess 14 in the felly, it follows that the end of the tire on which said lug is formed, will be stationary relatively to the felly, and only the thickened end 18 will move when the tire is tightened.

Having thus described my invention, I claim as new and desire to secure by Letters Patent—

The combination of the felly having a recess, and a tire having separable ends, one of which has on its inner side a lug constructed to fill the recess of the felly so as to practically form a part of the latter, the said lug being provided with a longitudinal bore, and end shoulder, and a transverse recess, while the other end of the tire has a thickened portion to fit the said shoulder, and is provided with a screw to enter the bore of the lug on the other tire end, and a nut held in the recess of the lug so as to be prevented from longitudinal movement, said nut being adapted to fit the screw, substantially as described.

SAMUEL A. SMITH.

Witnesses:
D. C. NEMCORN,
J. T. ANDREWS.